(No Model.) 2 Sheets—Sheet 1.

C. MENDENHALL.
ROAD SCRAPER.

No. 428,506. Patented May 20, 1890.

Witnesses
B. S. Lowrie.
Jno. L. Coudon

Inventor
Clarkson Mendenhall,
By C. A. Humphrey
Attorney (No Model.) 2 Sheets—Sheet 2.
C. MENDENHALL.
ROAD SCRAPER.
No. 428,506. Patented May 20, 1890.
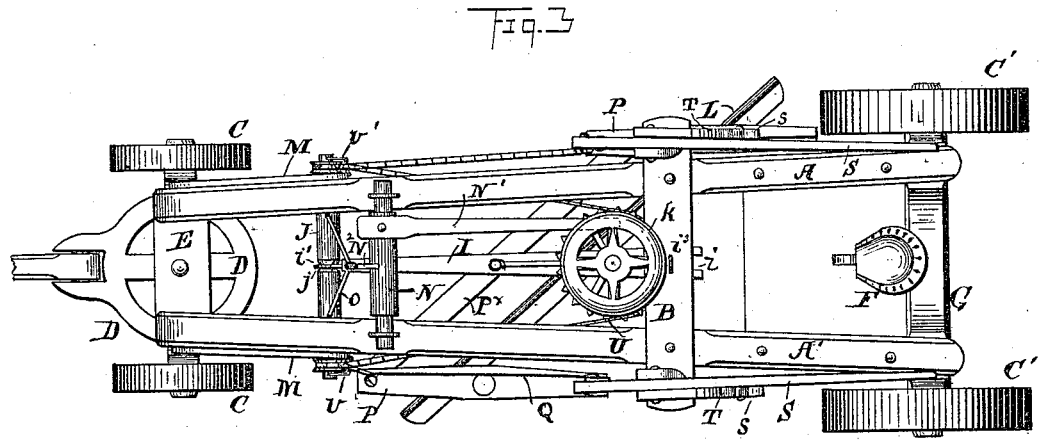
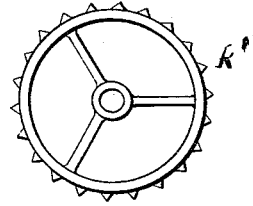
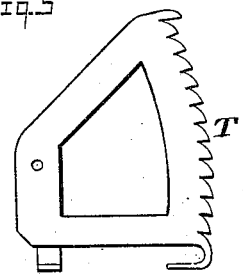
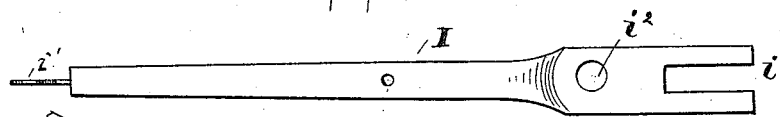
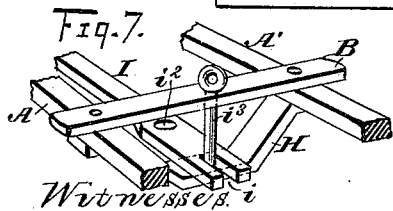
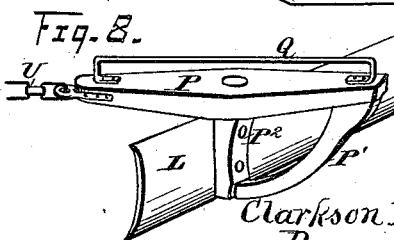
Witnesses
O. S. Lowrie
Jno. L. Condon
Inventor
Clarkson Mendenhall.
By C. P. Humphrey
Attorney

UNITED STATES PATENT OFFICE.

CLARKSON MENDENHALL, OF AKRON, ASSIGNOR OF ONE-HALF TO W. O. HERSHEY, OF LEETONIA, OHIO.

ROAD-SCRAPER.

SPECIFICATION forming part of Letters Patent No. 428,506, dated May 20, 1890.

Application filed December 27, 1888. Serial No. 294,798. (No model.)

*To all whom it may concern:*

Be it known that I, CLARKSON MENDENHALL, a citizen of the United States, residing at Akron, in the county of Summit and State of Ohio, have invented a certain new and useful Road-Scraper, of which the following is a specification.

My invention relates to machines for scraping earth from the surface of the ground for purposes of leveling, grading, &c.; and the objects of my invention are to produce a road-scraper the scraping-blade of which shall be readily reversible and capable of all of the various adjustments required in the work for which this class of machines is intended, and also to provide a direct front draft for the scraper-blade, and, furthermore, to render the draft attachments adjustable, so as to avoid any interference with the front wheels of the machine when making short turns with the same.

To the above purposes my invention consists in the peculiar and novel features of construction and arrangement hereinafter described, and specifically pointed out in the claims.

In order that my invention may be fully understood, I will proceed to describe it with reference to the accompanying drawings, which form a part of this specification, and in which—

Figure 1:
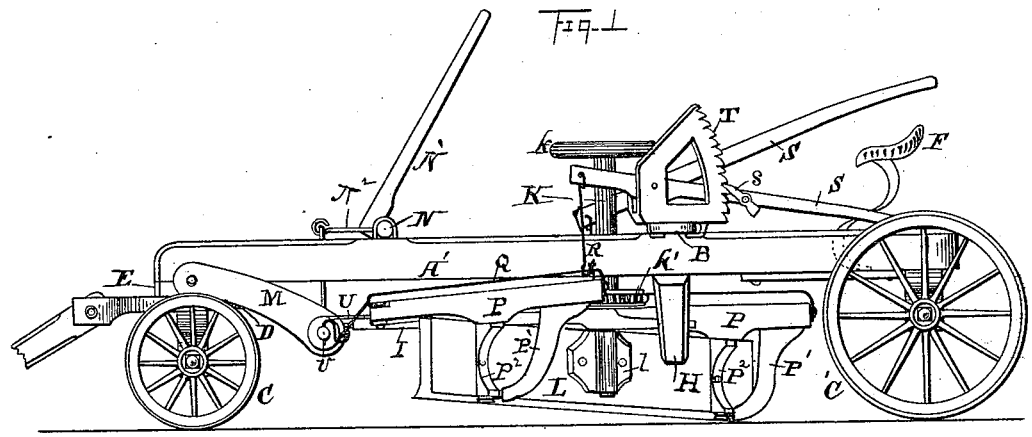
Figure 2:
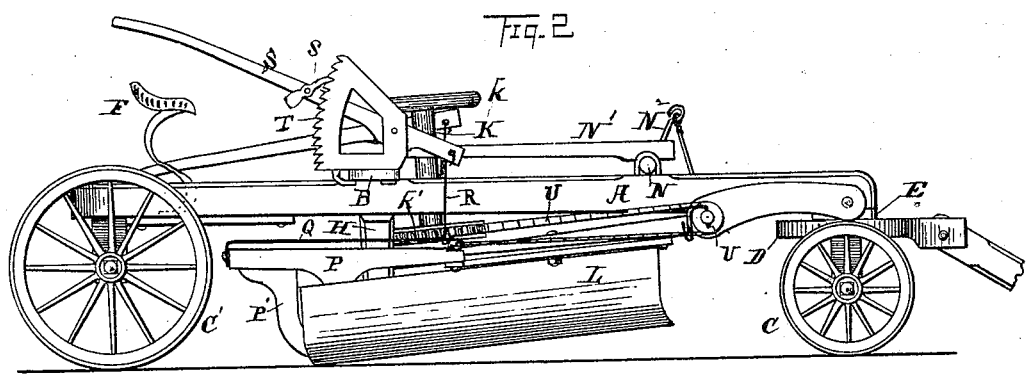

Figure 1 is a side elevation of a road-scraper constructed in accordance with my invention, the draft attachments being in their normal operative position and the scraper-blade being tilted to accord with a side or lateral grade. Fig. 2 is a similar view of the machine, exposing the opposite side from that shown in Fig. 1, the scraper-blade being in reversed position and the draft attachments being raised to clear the front wheels, as in turning the machine. Fig. 3 is a plan view of the machine as illustrated in Fig. 1. Figs. 4, 5, and 6 are detached views of certain details of construction hereinafter referred to. Fig. 7 is a detail perspective view of the traction-beam and its rear support; and Fig. 8 is a detail perspective view of one of the bars for controlling the scraper-blade.

The machine embraced in my present invention is of the four-wheeled type, the supporting-frame for the working parts consisting of two longitudinal beams A A', connected about midway of their length by a transverse beam B and supported at their front and rear ends, respectively, by the carrying-wheels C C C' C', the latter being of the under-turn type and the fifth-wheel D being connected beneath a cross-piece E, which connects the front ends of the beams A A'.

F designates the driver's seat, which is preferably attached to the rear axle G, as shown.

About midway of the length of the supporting-beams A A', and beneath the same, is secured a U-shaped hanger H, which is suspended vertically beneath the supporting-frame A A', and which extends transversely of the same coincident with the cross-piece B before referred to. Upon the base or bend of this hanger H rests the bifurcated rear end $i$ of the traction-beam I, (see Fig. 7,) a pin $i^3$ extending vertically downward through the cross-piece B and into the bend of hanger H and serving to retain the draft-beam in operative position. The front end of the beam I is provided with a downturned hook $i'$, which embraces a reduced portion or groove $j$ of a roller or rod J, to be hereinafter more fully described. Near the rear end of the draft or traction beam I is mounted a vertical staff K, the lower portion of which extends through an eye $i^2$ (see Fig. 6) in the rear portion of said draft-beam, and the lower extremity of which is confined loosely within a strap $l$ upon the rear side of the scraper-blade L. At its upper end the staff K carries a hand-wheel $k$, and at its lower portion said staff carries a sprocket-wheel $k'$, which rests upon the draft-beam I and thus constitutes the principal support for the staff K. The roller or rod J before mentioned is journaled loosely at its ends in the rear ends of a pair of bracket-arms M, the front ends of which are pivotally connected to opposite sides of the front end of the supporting-frame A A'.

N designates a rod or bar, which extends transversely of the machine and the ends of which are loosely journaled upon the upper sides of the supporting-frame beams A A'. This rod N carries a hand-lever N', which extends at right angles from the rod and to within convenient reach from the driver's seat F. A rod N² extends radially from the rod N, and is hooked at its outer end to engage the bend or angle of a V-shaped arm O, which extends radially from the bar N. It will thus be seen that by moving the lever N' in one direction or the other the rod N will be partially rotated upon its axis, and the rod J will be correspondingly rotated in the opposite direction.

At opposite ends of the scraper-blade L are pivotally secured elongated bars P, to the rear ends of which are attached pendent thrust-braces P', the lower ends of which abut against the lower ends of posts P², which are permanently connected to the rear side of the scraper-blade L and the upper ends of which are separably connected to the bars P, about midway of their length, as shown in detail in Fig. 8. Upon the upper sides of the bars P are secured elongated guide-rods Q with each of which a separable sliding connection is formed with the lower end of a link R, said connection being preferably of hook shape, as shown. The upper ends of these links R are loosely connected to the front ends of hand-levers S, which are pivoted upon opposite sides of the machine-frame, and which are provided with pawls s for engaging rack-segments T and thus retaining the levers S in any desired position of adjustment. The front ends of the bar P are connected by a cross-bar P×, which is pivoted midway of its length upon the draft-beam I, as shown.

U designates a sprocket-chain, one end of which is attached to one of the rods Q, and which is led from thence forward and beneath and over a pulley v at one end of the rod J, then rearward and partially around the sprocket-wheel k', thence forward beneath and partially around a pulley v' upon the opposite end of the bar J. Straps or guards v² are employed to retain the sprocket-chain upon the pulleys v v', as shown.

From the above description it will be seen that the draft upon the scraper-blade is a direct front draft, and that said blade may be readily adjusted by means of the hand-wheel k and sprocket-chain U, so as to deflect the dirt to either side of the machine or to carry it directly ahead, as in filling depressions in road-beds, and that by evident adjustments of the levers N' and S S the scraper-blade may be easily caused to act merely as a float for leveling earth which has been previously scraped from the ground-surface. It will be further seen that by depressing the lever N' the arms M M may be readily raised, so as to clear the wheels C in making a short turn of the machine. Various modifications in precise details of construction may be adopted without departing from the essential spirit of my invention.

Having thus described my invention, what I claim as new therein, and desire to secure by Letters Patent, is—

1. In a road-scraper, the combination, with a reversible scraper-blade, a pair of arms attached thereto, and a cross-bar pivotally connected with said arms and with the machine-frame, of a pair of levers having a longitudinally-adjustable connection with the said arms, whereby either end of the scraper-blade may be raised or lowered at will, substantially as described.

2. The combination of the reversible scraper-blade, the pivoted draft-arms, the vertical hand-staff having the sprocket-wheel, and the sprocket-chain connected to the ends of the scraper-blade and to the ends of the draft-arms and passing around the sprocket-wheel of the hand-staff, substantially as and for the purposes set forth.

3. The combination, with the reversible scraper-blade and the hand-staff with its sprocket-wheel, of the arms pivoted upon the front of the machine-frame and carrying the pulleys v v', and the sprocket-chain U, attached at its ends to the ends of the scraper-blade and passing around the said pulleys and sprocket-wheel, substantially as and for the purposes specified.

In testimony that I claim the above I have hereunto set my hand.

CLARKSON MENDENHALL.

In presence of—
C. P. HUMPHREY,
JNO. L. CONDRON.